US009648963B2

United States Patent
Johnston et al.

(10) Patent No.: US 9,648,963 B2
(45) Date of Patent: May 16, 2017

(54) DISINFECTABLE VINYL BABY BOUNCER SEAT COVER

(71) Applicants: Susan Diane Johnston, Albuquerque, NM (US); Katherine Elaine DeWees, Rio Rancho, NM (US)

(72) Inventors: Susan Diane Johnston, Albuquerque, NM (US); Katherine Elaine DeWees, Rio Rancho, NM (US)

( * ) Notice: Subject to any disclaimer, the term of this patent is extended or adjusted under 35 U.S.C. 154(b) by 45 days.

(21) Appl. No.: 14/838,547

(22) Filed: Aug. 28, 2015

(65) Prior Publication Data
US 2017/0055723 A1    Mar. 2, 2017

(51) Int. Cl.
*A47C 15/00* (2006.01)
*A47D 15/00* (2006.01)
*C08J 5/00* (2006.01)
*A47D 13/10* (2006.01)
*A47C 31/11* (2006.01)
*A47C 31/00* (2006.01)
*B60N 2/60* (2006.01)

(52) U.S. Cl.
CPC ............ *A47D 15/00* (2013.01); *A47C 31/007* (2013.01); *A47C 31/113* (2013.01); *A47D 13/107* (2013.01); *C08J 5/00* (2013.01); *A47C 31/11* (2013.01); *B60N 2/60* (2013.01); *C08J 2205/00* (2013.01)

(58) Field of Classification Search
CPC ..... A47C 15/00; A47C 31/007; A47C 31/113; A47C 31/107; A47C 31/11; B60N 2/60
USPC .............................................. 297/219.1–229
See application file for complete search history.

(56) References Cited

U.S. PATENT DOCUMENTS

| 3,220,768 | A | * | 11/1965 | Bird | ...................... B60N 2/609 |
| | | | | | 297/223 |
| 4,958,886 | A | * | 9/1990 | Barattini | .................. B60N 2/58 |
| | | | | | 297/224 |
| 5,005,901 | A | * | 4/1991 | Hinde | .................. B60N 2/6036 |
| | | | | | 297/220 |

(Continued)

*Primary Examiner* — Syed A Islam (57) ABSTRACT

A single disinfectable vinyl baby bouncer seat cover is made from health care use vinyl. The specifications of the health care vinyl permit surface disinfection using sodium hypochlorite (bleach) 1:10 diluted with water. A baby bouncer seat cover constructed from health care use vinyl allows disinfection in infection controlled environments using surface disinfectants containing sodium hypochlorite (bleach) 1:10 diluted with water. The disinfectable vinyl baby bouncer seat cover incorporates a seat belt restraint system and the design creates a central pocket that cradles an infant in a semi-reclined position. The design and health care use vinyl components incorporated in the invention, create a comfortable infant seat cover that maximizes disinfection within infection controlled environments. The disinfectable vinyl baby bouncer seat cover is placed over a baby bouncer frame, the baby bouncer frame is not inclusive in this invention. Environments such as hospital nurseries, neonatal intensive care units, pediatric intensive care units, pediatric units, large day care centers, and any other institutions that serve large numbers of infants may disinfect the seat covers after each use maintaining an environment of infection control.

7 Claims, 7 Drawing Sheets

(56) References Cited

U.S. PATENT DOCUMENTS

| | | | | |
|---|---|---|---|---|
| 5,028,472 A | * | 7/1991 | Gray | B60N 2/5833 |
| | | | | 150/158 |
| 5,150,947 A | * | 9/1992 | Croshaw | A47C 31/11 |
| | | | | 297/229 |
| 5,234,252 A | * | 8/1993 | Wallach | B60N 2/6036 |
| | | | | 297/220 |
| 5,265,933 A | * | 11/1993 | Croshaw | B60N 2/6063 |
| | | | | 297/228.1 |
| 8,678,499 B2 | * | 3/2014 | Kelly | B60N 2/2866 |
| | | | | 297/219.12 |
| 9,403,462 B2 | * | 8/2016 | Spitzer | A47C 31/11 |
| 2005/0275258 A1 | * | 12/2005 | Patterson | B60N 2/002 |
| | | | | 297/238 |
| 2007/0085392 A1 | * | 4/2007 | Friedland | B60N 2/2881 |
| | | | | 297/219.12 |
| 2014/0101859 A1 | * | 4/2014 | Testa | A47D 1/10 |
| | | | | 5/655 |

\* cited by examiner

DISINFECTABLE VINYL BABY BOUNCER SEAT COVER

CROSS-REFERENCES TO RELATED APPLICATIONS

Not Applicable

FEDERAL SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

This section should include a statement of the field of endeavor to which the invention pertains. This section may also include a paraphrasing of the applicable U.S. patent classification definitions or the subject matter of the claimed invention.

1. Field of the Invention

The invention pertains to a single baby bouncer cover seat made of health care use vinyl that can be disinfected with sodium hypochlorite (bleach) diluted 1:10 with water or related disinfection products. Existing baby bouncer seat covers are primarily made of fabric or cloth and must be removed and laundered in order to sanitize them. The disinfectable vinyl baby bouncer seat cover is made of health care use vinyl and may be disinfected between uses with sodium hypochlorite (bleach) diluted 1:10 with water or related disinfection products. Applicable U.S. patent classifications of the invention considered in this application include Class 297, Chairs and Seats, Subclass 440.11 Detachable Fabric Component, and Class D06, Furnishings, Subclass 333 describing a juvenile portable support or restraining seat.

2. Background of the Prior Art

Prior related art includes embodiments made of fabric elements that may be laundered after use for cleanliness. These embodiments are directed toward public consumer use and are normally assigned to one child in a home environment. None of them are designed to accommodate an infection controlled environment where multiple uses occur daily and disinfection between uses is necessary. Although the prior art fabric embodiments may be removed and laundered after each use for cleanliness, this is not a viable, nor convenient alternative for hospital nurseries, neonatal intensive care units, pediatric intensive care units, pediatric care centers, day care centers, and other large institutions that are caring for many infants daily. The disinfectable vinyl baby bouncer seat cover embodiment solves the problem of disinfection in multiple use environments where infection control is paramount. The construction of the baby bouncer seat cover of health care use vinyl is not found in prior art embodiments, and is necessary for use in infection controlled, multiple use environments.

BRIEF SUMMARY OF THE INVENTION

A baby bouncer seat cover is disclosed which is made of health care use vinyl in an envelope design. The vinyl baby bouncer seat cover may be disinfected using sodium hypochlorite (bleach) 1:10 dilution with water. The single unit baby bouncer disinfectable vinyl seat cover is constructed as a support seat cover for existing baby bouncer frames. The health care vinyl component is purchased from a U.S. vinyl supplier. The specifications of the vinyl make it suitable for use in health care environments. The vinyl meets California Fire Regulation (Bulletin 117, Sec E.) Automotive (MVSS302), BIFMA (Screen Test Sec, 4.6.1.1) Boston Fire Code (BFD IX-I), CID A-A-2950-A (Federal Standard 191A test method 5903) replaces CCC-A-690a, and UPHOLSTERY Requirements of FAR 25.853. The health care use vinyl used in this construction has superior tear strength, is easily tailored, weighs 37.7 ounces per linear yard (+/−5%), is resistant to scuffs and scrapes and is produced from environmentally friendly materials and processes. The invention solves the problem of disinfection in infection controlled environments due to the health care vinyl construction component, not present in prior art embodiments.

DETAILED DESCRIPTION OF THE INVENTION

Figure 1:
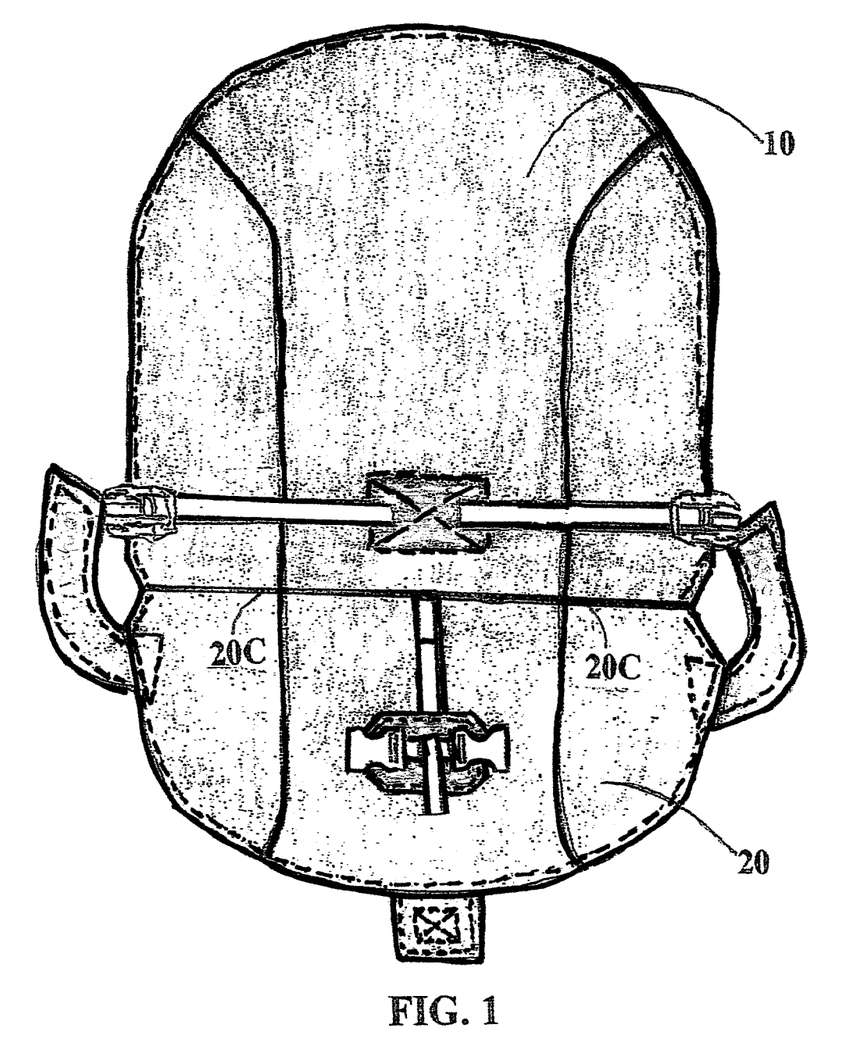
FIG. 1 is a front perspective view of a disinfectable vinyl baby bouncer seat cover removed from a baby bouncer frame device. All shaded portions are made of health care use vinyl.

A disinfectable vinyl baby bouncer seat cover front view is shown in FIG. 1. All shaded areas are constructed of health care use vinyl. Reference 10 is a perspective view of the upper front portion of a disinfectable vinyl baby bouncer seat cover. Reference 20 is a perspective view of the lower front portion of a disinfectable vinyl baby bouncer seat cover. Reference 20C designates a horizontal seam, sewn on the inside, (wrong) side of the health care use vinyl, attaching the upper front portion, reference 10 and the lower front portion, reference 20 together. Reference 20C, horizontal seam is 14 inches (35.56 cm) in length.

Figure 2:
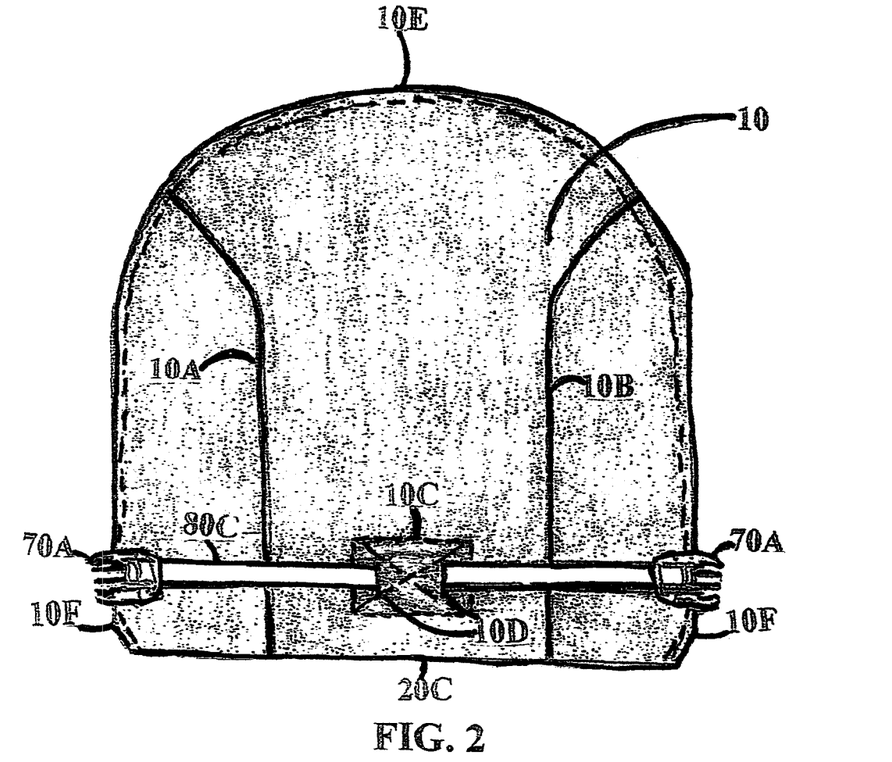
FIG. 2 is a perspective view of reference 10, upper front portion of a disinfectable vinyl baby bouncer seat cover including construction references.

FIG. 2 A perspective view of the upper front portion of a disinfectable vinyl baby bouncer seat cover is shown in FIG. 2, and is denoted as reference 10. The length measurement of the upper front portion, reference 10, is 18 inches (45.72 cm) from lower boundary at horizontal seam, reference 20C, to furthest upper front boundary, reference 10E. The width measurement of the upper front portion, reference 10, is 16⅜ inches (41.5925 cm) horizontally from left to right at references 10F to 10F. References 10F (2) designate the upper front and upper back joint end areas where the upper front portion, reference 10, is sewn to the upper back portion, reference 40, FIG. 7 of the disinfectable vinyl baby bouncer seat cover.

FIG. 2 Upper front portion, 10, perspective view shows two reduction seams, references 10A and 10B, sewn on the inside (wrong) surface of the health care use vinyl. The reduction seams 10A and 10B are sewn 6 inches (15.24 cm) apart at the lower boundary of the upper front portion, reference 10, and continue on an upward curve to 10 inches (25.4 cm) apart at the boundary of the upper front portion, reference 10.

Figure 3:
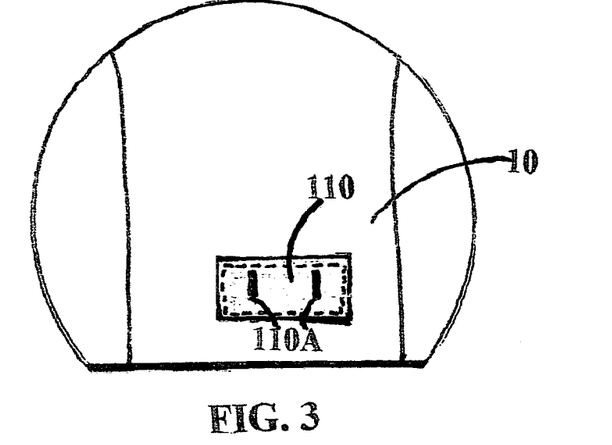
FIG. 3 is a detail view of the upper front portion of a disinfectable vinyl baby bouncer seat cover from the inside (wrong) side of the vinyl to show the construction and placement of the reinforcement support for the seat belt restraint, reference 110, within the upper front portion, reference 10, of the disinfectable vinyl baby bouncer seat cover.

FIG. 2 Upper front portion, 10, perspective view reference 10C shows the upper portion of the seat belt restraint. To create the upper front portion of the seat belt restraint additional support is added to the upper front portion, reference 10. This additional support is provided by adding, reference 110, reinforcement support for seat belt. Reinforcement support for seat belt, reference 110, is a rectangle of health care use vinyl measuring 2 inches (5.08 cm) by 4 inches (10.16 cm) containing 2 button holes, references, 110A and 110A, centered and spaced approximately 2⅞ inches (7.3025 cm) from each other. Reinforcement support for seat belt, reference 110, is inserted inside (wrong) side of the health care use vinyl at upper front portion, reference 10, at the same location as is reference 10C, topstitching for seat belt restraint area. Reinforcement support for seat belt, reinforcement is sewn in place by top stitching, reference 10C wrong side to wrong side, after seat belt nylon webbing has been inserted through button holes 110A on reference 110, and subsequently button holes, references 10D (2), within reference 10C, topstitching. Topstitching in an X shape from upper left to lower right corner and upper right to lower left corner secures the nylon webbing in place. FIG. 3 shows a detail perspective of reinforcement support for seat belt, reference 110.

FIG. 2 Upper front portion, 10, perspective view designation reference 10C is an area of topstitching located 2½ inches (6.35 cm) above horizontal seam, reference 20C, and 1 inch (2.54 cm) inside the upper reduction seams, references 10A and 10B. The topstitching area creates a rectangle measuring 2 inches (5.08 cm) by 4 inches (10.16 cm) and has 2 button holes, references 10D and 10D centered and spaced approximately 2⅞ inches (7.3025 cm) from each other. The topstitching is done after the nylon webbing is inserted into the button holes, reference 110A, of reinforcement for seat belt, reference 110, then pulled through the button holes 10D of upper front portion, reference 10. Topstitching in an X shape from upper left to lower right corner and upper right to lower left corner secures the nylon webbing in place, as stated above.

FIG. 2 Upper front portion, 10, perspective view shows a ¾ inch (1.905 cm) nylon webbing belt, reference 80C, which is threaded through the button holes, 110A (2), of the reinforcement support for seat belt, reference 110, and successively through the button holes references 10D (2) of the upper front portion, reference 10. Two male plastic belt buckle ends, references 70A and 70A are threaded onto nylon webbing belt, reference, 80C. Each distal end of the nylon webbing belt, reference 80C, is folded back onto the belt approximately 1 inch (2.54 cm) and stitched to keep the male plastic belt buckle ends, reference 70A, (2), from sliding off the nylon webbing, reference 80C.

FIG. 3 is a detail view of the upper front portion, 10, of a disinfectable vinyl baby bouncer seat cover from the inside (wrong) side of the vinyl. This detail view shows the placement inside the upper front portion, reference 10, of the reinforcement support for seat belt restraint, reference 110. Reference 110, reinforcement support for seat belt restraint is a rectangle that measures 2 inches (5.08 cm) by 4 inches (10.16 cm) and has 2 button holes, references 110A and 110A centered and spaced approximately 2⅞ inches (7.3025 cm) from each other. Reinforcement support for seat belt restraint reference 110, is placed 2½ inches (6.35 cm) above horizontal seam, reference 20C, and 1 inch (2.54 cm) inside the upper reduction seams, references 10A and 10B, in this manner it lines up with reference 10C, topstitching area for seat belt restraint, on the inside (wrong) side of vinyl on upper front portion, reference 10. When reference 110 is stitched to the upper front portion, reference 10, by the topstitching, reference 10C, a double layer of vinyl results and provides stability and a firm support for the nylon webbing, reference 80C, used in the seat belt restraint.

Figure 4:
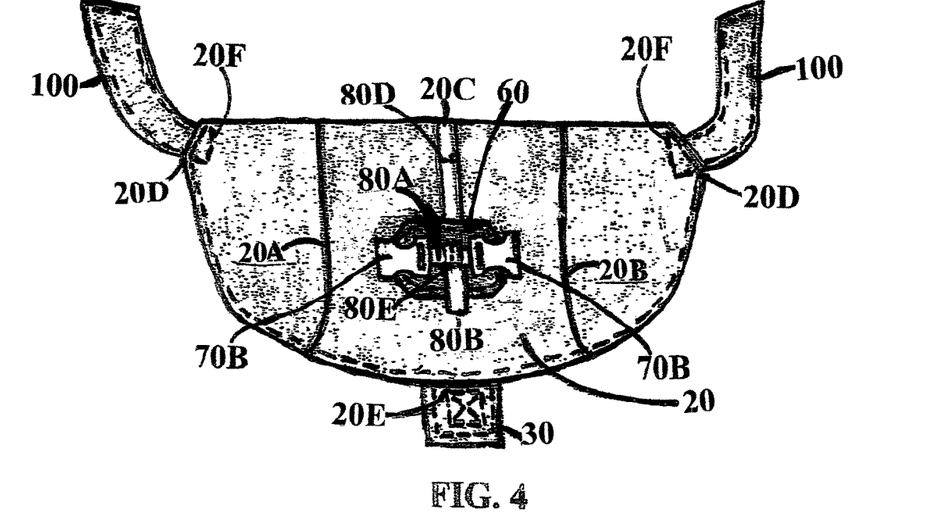
FIG. 4 is a perspective view of reference 20, lower front portion of a disinfectable vinyl baby bouncer seat cover including construction references.

FIG. 4 A perspective view of the lower front portion of a disinfectable vinyl baby bouncer seat cover is shown in FIG. 4 and is denoted as reference. The length measurement of lower front portion, reference 20, is 11 inches (27.94 cm) from horizontal seam, reference 20C, to lower front portion boundary, reference 20E. The width measurement of lower front portion, reference 20, reaches 15 inches (38.1 cm) across from references 20D (2), lower front/lower back joint areas. References 20D designate the lower front and lower back joint end areas where the lower front, reference 20, of the disinfectable vinyl baby bouncer seat cover is sewn to the lower back, reference 50, FIG. 8 of the disinfectable vinyl baby bouncer seat cover on each side.

FIG. 4 Lower front portion, 20, perspective view references 20A and 20B are two reduction seams on lower front portion, reference 20, similar to reduction seams 10A and 10B on upper front portion, reference 10. References 20A and 20B reduction seams are sewn 6 inches (15.24 cm) apart at the top of the lower front portion, reference 20, and curve to end at 9 inches (22.86 cm) apart at the lower front boundary. Both reduction seams, references 20A and 20B, are sewn on the inside (wrong) side of the health care vinyl.

FIG. 4 Lower front portion, 20, perspective view, designates reduction seams, references 20A and 20B on lower front portion, reference 20, combined with reduction seams, references 10A and 10B, upper portion, reference 10, in FIG. 2, create depth and shape to form a pocket for a baby to be placed in a semi-reclined position within the disinfectable vinyl baby bouncer seat cover.

FIG. 4 Lower front portion, 20, perspective view reference 60 shows the tummy pad made of health care vinyl which incorporates the lower front portion of the seat belt restraint. Tummy pad, reference 60, is constructed from two pieces, references 60A and 60B, FIG. 11, of health care use vinyl sewn wrong sides together and topstitched around the edges. Tummy pad, reference 60, is in the shape of an octagon with upper and lower edges measuring 4 inches (10.16 cm), corners measuring 1 inch (2.54 cm) and vertical edges measuring 2 inches (5.08 cm). Tummy pad, reference 60, measures 5 inches (12.7 cm) in length and 3 inches (7.62 cm) in height. After construction, tummy pad, reference 60, is ready to secure the lower front portion of the seat belt restraint.

FIG. Lower front portion, 20, perspective view of tummy pad, reference 60, contains reference 80A, which is a ¾ inch (1.905 cm) nylon webbing piece which measures 3.6 inches (9.144 cm) in length. References 70B are two female plastic belt buckle ends which are threaded onto nylon webbing piece, reference 80A. The ends of nylon webbing piece, reference 80A, are brought together creating a closed loop. The loop is sewn with a center vertical seam to secure the female plastic buckle ends, reference 70B (2) within and threaded onto nylon webbing piece, reference 80A.

FIG. 4 Lower front portion, 20, perspective view, reference 80B is a ¾ inch (1.905 cm) nylon webbing piece measuring 10 inches (25.4 cm) in length. Reference 80B, nylon webbing is secured within horizontal seam 20C on the inside (wrong) side of the health care use vinyl to lower front portion, reference 20. Nylon webbing piece, reference 80B is laid flat on the exterior of lower front portion, reference 20, and secured at reference 80D, approximately 2 inches (5.08 cm) from reference 20C, horizontal seam. Reference 80D is an area of topstitching to secure to nylon webbing piece, reference 80B, to the exterior vinyl of lower front portion, reference 20.

Figure 5:
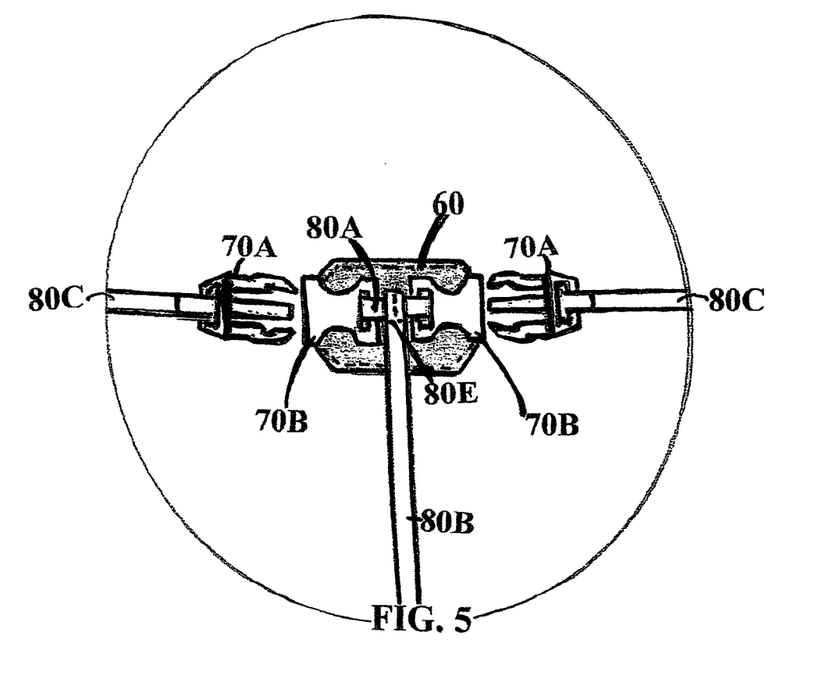
FIG. 5 is a detail perspective of the seat belt restraint. The strapping is made of 100% nylon webbing and the buckle components are made of plastic. The shaded portion is made of health care use vinyl, is double sided, and serves as a tummy pad, reference 60, between the baby and the seat belt restraint.

FIG. 4 Lower front portion, 20, perspective view, reference 80B, free end of nylon webbing, is secured to tummy pad, reference 60, at center with stitching in preparation to secure nylon webbing, reference 80A, and attached female plastic buckle ends 70B (2). After nylon webbing, reference 80B is secured by stitching to tummy pad, reference 60, nylon webbing piece, reference, 80A, with female plastic buckle ends 70B (2) attached, is placed atop nylon webbing piece, reference, 80B. Nylon webbing piece, reference 80B, is then secured by stitching at reference 80E. Reference 80E is a horizontal topstitching area securing nylon webbing, reference 80B, as it encloses nylon webbing reference 80A onto tummy pad, reference 60. Both nylon webbing references 80A and 80B are further secured by topstitching on the exterior of their nylon webbing surface where they are secured jointly to tummy pad, reference 60. FIG. 5 shows a detail perspective of lower front portion seat belt restraint construction referenced in this paragraph.

FIG. 4 Lower front portion, 20, perspective view reference 100 is a perspective front view of the two securing side straps attached to lower front portion, reference 20. Reference 100, securing side straps attach the front of the disinfectable vinyl baby bouncer seat cover onto the back of the disinfectable vinyl baby bouncer seat cover. The securing side straps, references 100 (2) also close the disinfectable vinyl baby bouncer seat cover against the baby bouncer frame. Reference 100, securing side straps are made of health care use vinyl, are constructed of two pieces of health care use vinyl sewn wrong sides together, and top stitched. References 90A, FIG. 11 loop closures are sewn onto the back of both securing side straps, references 100. References 90B, hook closures are sewn onto the back of the upper back portion reference 40, FIG. 7 of the disinfectable vinyl baby bouncer cover seat. Each securing side strap, references 100, attaches to each side of lower front portion, reference 20, so as the bottom end of the securing side straps are aligned just above reference 20D, lower front/lower back joint area. References 20D designate the lower front and lower back joint area where the lower front portion, reference 20, is sewn to the lower back, reference 50, FIG. 8 of the disinfectable vinyl baby bouncer seat cover.

FIG. 4 Lower front portion, 20, perspective view reference 100 securing side straps are attached by placing the lower end of securing side straps, reference 100 under the open lower back portion, reference 20. The securing side straps, reference 100, are placed vinyl side of securing side strap, reference 100 sewn to inside (wrong) side of lower front portion, reference 20, by topstitching in a triangular shape, reference 20F for a strong attachment.

FIG. 4 Lower front portion, 20, perspective view reference 100, securing side straps curve in an upward direction and measure 7 inches (17.78 cm) in length and 2 inches (5.08 cm) in width.

FIG. 4 Lower front portion, 20, perspective view reference 30 shows a front view of the flap enclosure piece for bouncer switch components. Flap enclosure piece for bouncer switch components, reference 30 is made of a single piece of health care use vinyl and measures 5 inches (12.7 cm) in length and 4 inches (10.16 cm) in width. Reference 30, is secured by a seam on the inside (wrong) side, of lower front piece, reference 20 at lower front center boundary. On wrong side of flap enclosure piece of bouncer switch components, reference 30, is hook closure 30A, FIG. 11, which measures 2 inches (5.08 cm) in length and 3 inches (7.62 cm) in width. Hook closure, reference 30A, encloses bouncer switch components by fastening to loop closure, reference 90B, FIG. 11 on lower back portion reference 50, FIG. 11.

FIG. 5 A detail view of the tummy pad, reference 60 and the components of the seat belt restraint is shown in FIG. 5. The seat belt restraint secures the baby into the disinfectable vinyl baby bouncer seat cover when it is on a baby bouncer frame. Nylon webbing, reference 80B is secured to tummy pad, reference 60, at center with stitching. After nylon webbing, reference 80B is secured by stitching to tummy pad, reference 60, nylon webbing piece, reference 80A, with female plastic buckle ends 70B (2) attached, is placed atop nylon webbing piece, reference, 80B and stitched to secure it to the tummy pad, reference 60 as well. Nylon webbing piece, reference 80B, is then pulled up and over nylon webbing piece 80A and secured by stitching at reference 80E. Reference 80E is a horizontal topstitching area securing nylon webbing, reference 80B, as it encloses nylon webbing reference 80A onto tummy pad, reference 60. Both nylon webbing references 80A and 80B are further secured by topstitching on the exterior of their nylon webbing surface where they are secured jointly to tummy pad, reference 60.

FIG. 5 Detail view of the tummy pad, reference 60, shows reference 80C nylon webbing from each side of the front top portion, reference 10, with male belt buckle ends (2), reference 70A. The male buckle ends, reference 70A (2) buckle into the female buckle ends (2), reference 70B on either side of the tummy pad, reference 60.

Figure 6:
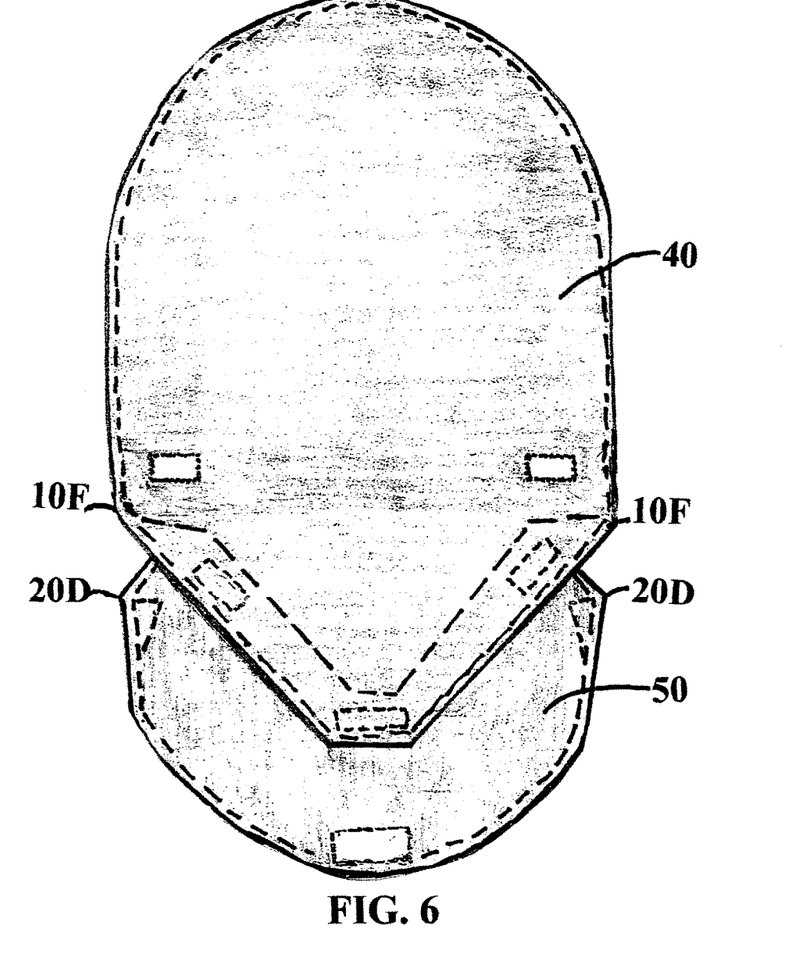
FIG. 6 is a perspective view of the back of a disinfectable vinyl baby bouncer seat cover removed from a baby bouncer device. All shaded portions are made of health care use vinyl. Attachments are hook and loop fasteners, in the attached position, health care use vinyl exterior covers these fasteners.

FIG. 6 A disinfectable vinyl baby bouncer seat cover perspective back view is shown in FIG. 6. All shaded areas are constructed of health care use vinyl. Reference 40 is a perspective view of the upper back portion of a disinfectable vinyl baby bouncer seat cover. Reference 50 is a perspective view of the lower back portion of a disinfectable vinyl baby bouncer seat cover. The back portions of the disinfectable vinyl baby bouncer seat cover are sewn to the front portions of the disinfectable vinyl baby bouncer seat cover on the inside (wrong) side of the vinyl, for attachment. The disinfectable vinyl baby bouncer seat cover is also topstitched along the upper boundary and lower boundary for esthetics and reinforcement. References 10F (2) designate the joint end areas where the upper front portion, reference 10, and upper back portion, reference 40 are sewn together. References 20D (2) designate the joint end areas where the lower front portion, reference 20, and lower back portion, reference 50, are sewn together.

Figure 7:
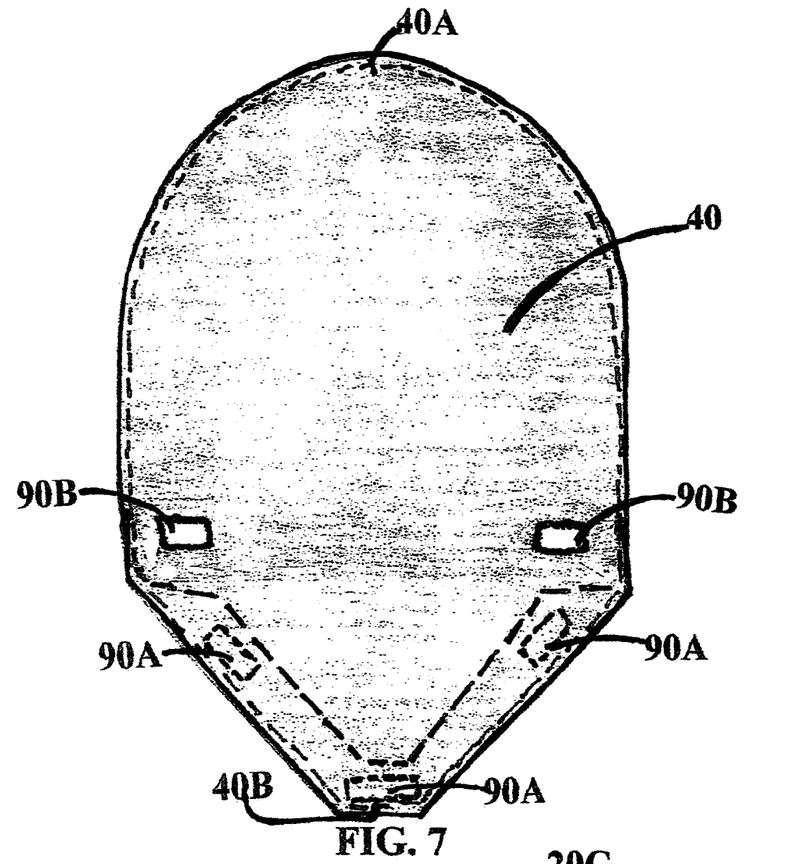
FIG. 7 is a perspective view of reference 40 upper back portion of a disinfectable vinyl baby bouncer seat cover including construction references.

FIG. 7 A perspective view of the upper back portion of a disinfectable vinyl baby bouncer seat cover is shown in FIG. 7, and is denoted in reference 40. The length measurement of the upper back portion, reference 40, from reference 40A, top center of the upper back portion, 40, to 40B bottom center of the upper back portion, 40, is 22 inches (55.88 cm). The width measurement of the upper back portion, reference 40, is 16⅜ inches (41.5925 cm) horizontally from left to right at references 10F to 10F. References 10F (2) designate the upper front and upper back joint end areas where the upper front portion, reference 10, FIG. 2 is sewn to the upper back portion, reference 40 of the disinfectable vinyl baby bouncer seat cover. Upper back portion, reference 40 is topstitched with upper front portion, reference 20, FIG. 2 for reinforcement and esthetics.

FIG. 7 Upper back portion, reference 40, perspective view also shows hook and loop closures that form attachments for the disinfectable vinyl baby bouncer seat cover. References 90B on the upper back portion, 40, are sewn to the exterior of the vinyl and attach to the reference 90A, hook attachments sewn onto the back side of the securing side strips, reference 100, FIG. 4. References 90A are hook attachments, sewn on the inside (wrong) side of the vinyl, and attach to the three top loop attachments, references 90B, on the lower back portion, reference 50, FIG. 8. These three attachments create an envelope design encompassing the baby bouncer frame, covering the back completely, maximizing the use of health care use vinyl and infection controlled surfaces in seat cover design.

Figure 8:
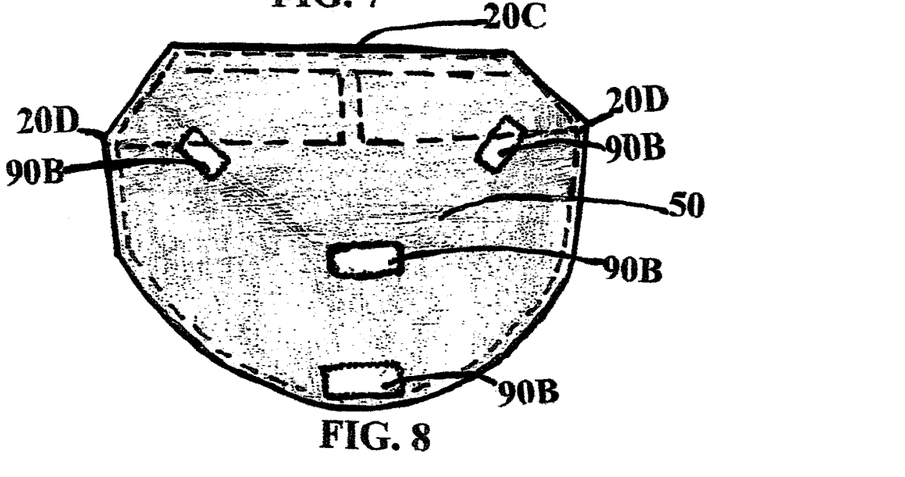
FIG. 8 is a perspective view of reference 50 of lower back portion of a disinfectable vinyl baby bouncer seat cover including construction references.

FIG. 8 Is a perspective view of the lower back portion of a disinfectable baby bouncer cover, denoted by reference 50. The length measurement of lower back portion, reference 50, is 11½ inches (29.21 cm) from horizontal seam, reference 20C, to lower back portion boundary, reference 50A. The width measurement of lower back portion, reference 50, reaches 15 inches (38.1 cm) across from references 20D (2), lower front/lower back joint areas. References 20D (2) designate the lower front and lower back joint end areas where the lower front portion, reference 20, FIG. 4 is sewn to the lower back portion, reference 50 of the disinfectable vinyl baby bouncer seat cover. Lower back portion, reference 50, is topstitched with lower front portion, reference 20, FIG. 4 for reinforcement and esthetics.

FIG. 8 Lower back portion, reference 50, perspective view also shows loop closures that form attachments for the disinfectable baby bouncer seat cover. The three top loop closures, references 90B attach to hook closures, references 90A at lower end of upper back portion, reference 40, FIG. 7. This closes the back of the disinfectable vinyl baby bouncer seat cover. The loop closure, reference 90B at the lower center boundary, is the attachment for hook closure, reference 90A, that is sewn on the inside (wrong) side of reference 30, FIG. 4 flap enclosure piece for bouncer switch components. This encloses the switches incorporated into bouncer frames in health care vinyl and enhances the infection control component of the disinfectable vinyl baby bouncer seat cover.

Figure 9:
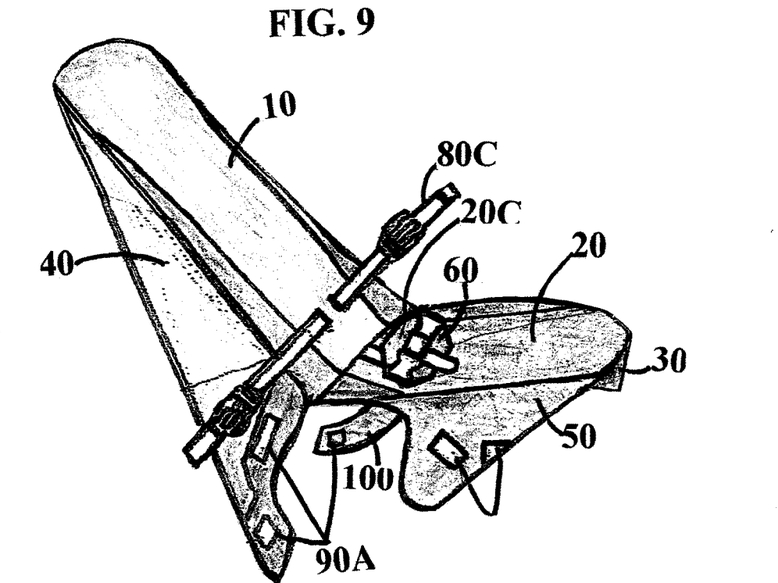
FIG. 9 is a perspective side view of a disinfectable vinyl baby bouncer cover fully assembled, in an open position, removed from a baby bouncer frame device. All shaded portions are made of health care use vinyl

FIG. 9 is a perspective side view of a disinfectable vinyl baby bouncer seat cover in an open position ready to be placed onto a baby bouncer frame.

FIG. 9 Perspective side view reference 10, denotes the upper front portion, which is sewn to upper back portion reference 40. Within upper front portion, 10, the upper portion of the seat belt restraint is sewn in, reference 80C denotes the nylon webbing of the seat belt. FIG. 9 Perspective side view of the upper back portion, reference 40, denotes the upper back portion which is sewn to upper front portion, reference 10. Two of the hook closures, reference 90A, are shown in this perspective side view. These hook closures, references 90A, will attach to references 90B on lower back portion, reference 50 to close the disinfectable vinyl baby bouncer seat cover once it is on the bouncer frame.

FIG. 9 Perspective side view reference 20, denotes the lower front portion, which is sewn to lower back portion, reference 50. Within lower front portion, 20, reference 20C designates the horizontal seam that joins the upper front portion, reference 10 to lower front portion, reference 20. Also found within lower front portion, reference 20, is reference 60, the tummy pad which incorporates the lower front portion of the seat belt restraint which is shown in detail in FIG. 5. A third reference on lower front portion, reference 20 is reference 30, flap enclosure piece for bouncer switch components, this flap enclosure for bouncer switch components will attach to a loop enclosure on lower back portion, reference 50, to cover switch components incorporated onto baby bouncer frames. Finally on lower back portion, reference 20, reference 100, securing side strap on the far side is shown, with reference 90A, hook closure ready to attach to upper back portion, 40, reference 90B loop closure.

FIG. 9 Perspective side view reference 50, denotes the lower back portion which is sewn to lower front portion, reference 20. Shown on the lower back portion, reference 50, are two of the loop closures, references 90B, that will attach to hook closures, reference 90A, upper back portion, reference 20.

Figure 10:
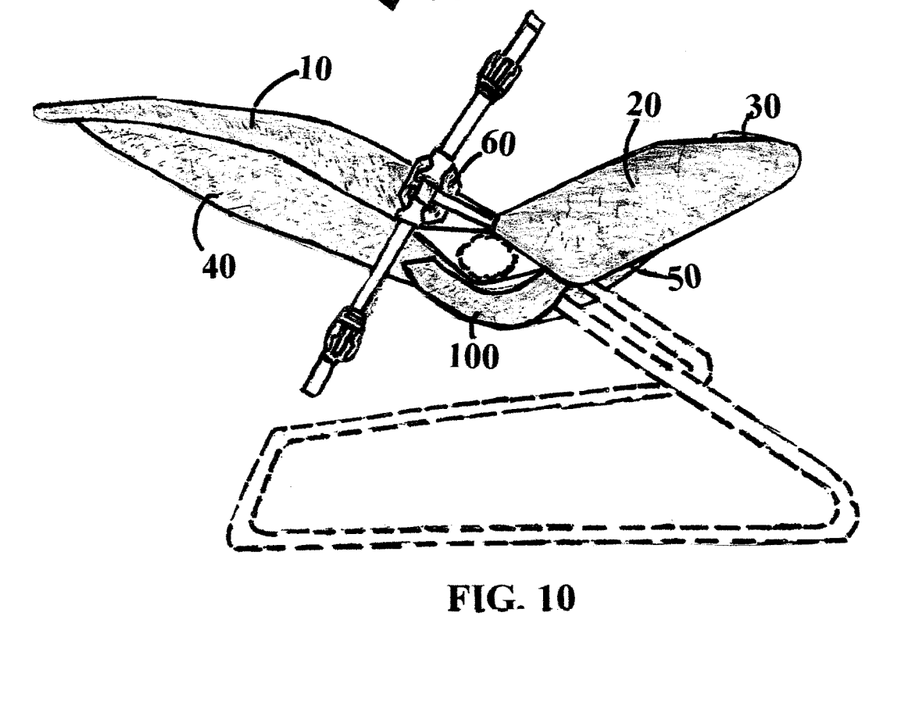
FIG. 10 is a perspective side view of a disinfectable vinyl baby bouncer seat cover, fully assembled, placed on a baby bouncer frame. All shaded portions are made of health care use vinyl.

FIG. 10 A perspective view of a disinfectable vinyl baby bouncer seat cover placed onto a baby bouncer frame is shown in FIG. 10. Reference 10 designates the upper front portion, reference 20 designates the lower front portion, reference 30 designates the flap enclosure piece for bouncer switch components, reference 40 designates the upper back portion, reference 50 designates the lower back portion, reference 60 designates the tummy pad and the seat belt components incorporated into it (seat belt restraint show in detail in FIG. 5), and reference 100 designates the securing side strap.

Figure 11:
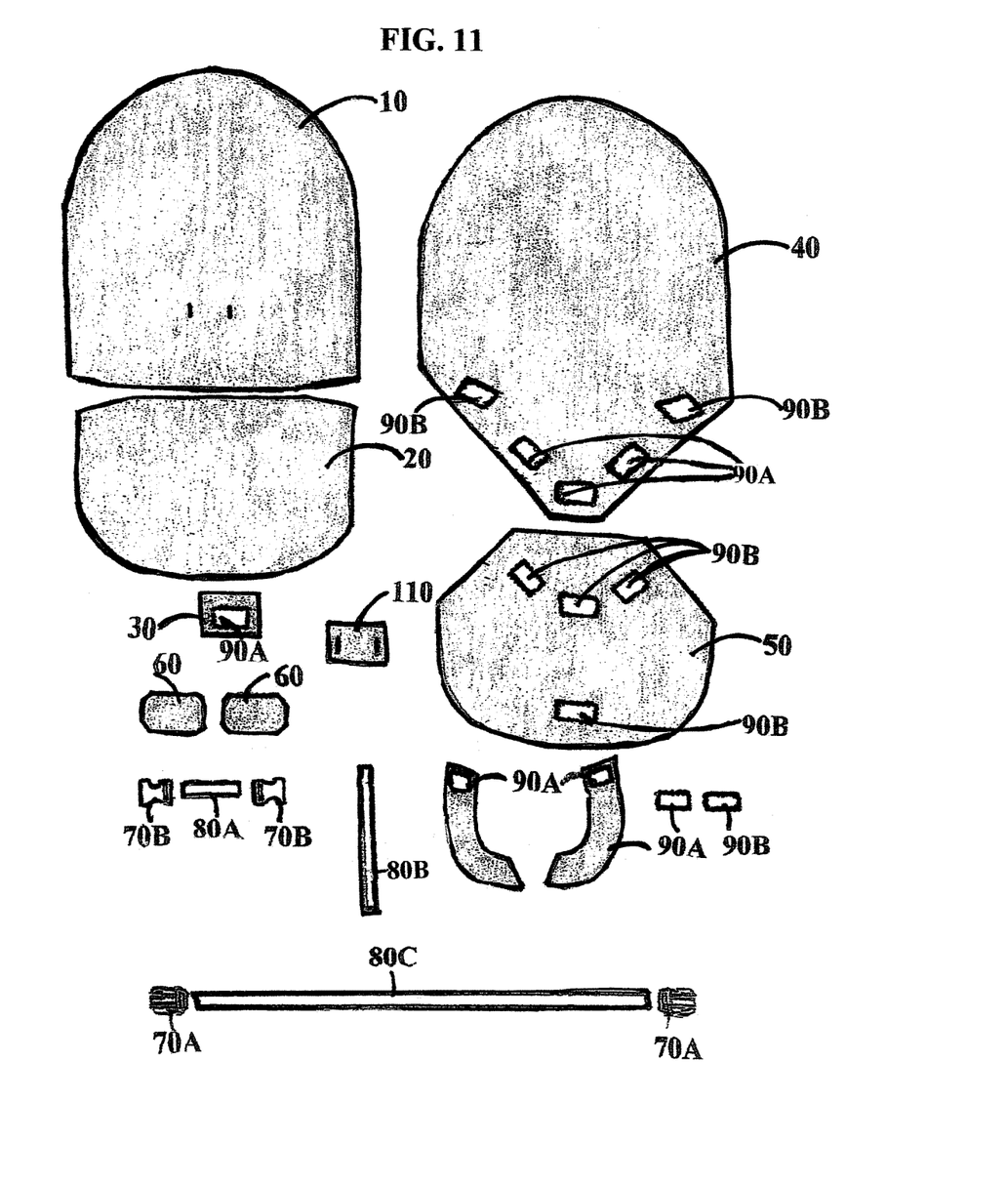
FIG. 11 is an exploded view of the component pieces used to construct a disinfectable vinyl baby bouncer seat cover. All shaded components are made of health care use vinyl. Fasteners are all hook and loop material, webbing is 100% nylon and buckle components are plastic type.

FIG. 11 An exploded view showing all of the components that make up the disinfectable vinyl baby bouncer seat cover is shown in FIG. 11. All shaded portions are health care use vinyl. Reference 10, denotes the upper front portion, reference 20 denotes the lower front portion, reference 30 denotes the flap enclosure piece for bouncer switch components, reference 40 denotes the upper back portion, reference 50 denotes the lower back portion, reference 60 denotes the two pieces that are sewn together wrong sides together to construct the tummy pad, reference 70A denotes the male portion of the buckle ends, part of the seat belt restraint, reference 70B denotes the female portion of the buckle ends, part of the seat belt restraint, 80A denotes a ¾ inch (1.905 cm) nylon webbing piece which measures 3.6 inches (9.144 cm) in length to which the female buckle ends, reference 70B are threaded and then captured as the webbing is sewn into a loop, reference 80B is a ¾ inch (1.905 cm) nylon webbing piece measuring 10 inches (25.4 cm) in length that encloses reference 80A, nylon webbing and captured female buckle ends, 70B, and secures to tummy pad, reference 60, at one end and at reference 20C, horizontal seam at the other end. Reference 80B is also sewn approximately 2 inches (5.08 cm) from reference 20C, horizontal seam. Continuing with the exploded view components, reference 80C is a nylon webbing piece that secures male buckle pieces (2) 70A at either end and is secured to upper front portion, reference 10, detail is shown in FIGS. 2 and 3.

References 90A and 90B denote hook and loop closures that are sewn onto the disinfectable vinyl baby bouncer seat cover at denoted locations. All references 90A are the hook portion of the closure attachment and all 90B references are the loop portion of the closure attachments. Reference 100 denotes the two securing side straps and finally, reference 110 denotes reinforcement for upper portion seat belt restraint that is sewn wrong side to wrong side on upper front portion, reference 10, (detailed view FIG. 3).

We claim:

1. A removable baby bouncer seat cover adapted to cover a baby bouncer frame, the baby bouncer frame comprising a substantially vertically oriented back portion and a substantially horizontally oriented seat portion supported by a base, baby bouncer frame seat portion further comprises a mode selector switch, the baby bouncer seat cover comprising a back portion and a seat portion, the back portion is formed from front back and rear back portions joined together, the seat portion is formed from front seat and rear seat portions joined together, the rear back portion comprising a tapered bottom and further comprising a means of releasably attaching to rear seat portion, the front seat portion further comprising a flap element comprising a means of releasably attaching to rear seat portion, a pad assembly comprising seat belt strap and connectable closures is centrally affixed to the front seat portion, wherein the front seat portion flap element covers the baby bouncer frame mode selector switch when the flap element is attached to rear seat portion with hook and loop fasteners.

2. A baby bouncer seat cover of claim 1 wherein the material of the baby bouncer cover is selected from the group of vinyl polymers made for health care environments.

3. A baby bouncer seat cover of claim 1 wherein the rear back portion tapered bottom means of releasably attaching to rear seat portion are selected from the group consisting of mating hook and loop fasteners.

4. A baby bouncer seat cover of claim 1 wherein the rear back portion tapered bottom attaches to the rear seat portion to form an envelope enclosure.

5. A baby bouncer seat cover of claim 1 wherein the front seat securing side straps means for releasably attaching to the rear seat portion are selected from the group consisting of mating hook and loop fasteners.

6. A baby bouncer seat cover of claim 1 wherein front back portion extending seat belts and connectable closures and pad assembly seat belt and connectable closures form a three point seat belt restraint system when connectable closures are joined together.

7. A baby bouncer seat cover of claim 1 wherein the front seat portion flap element means for releasably attaching to rear seat portion are selected from the group consisting of mating hook and loop fasteners.

* * * * *